May 31, 1938.        O. BULOW        2,119,418
FISHING LINE ATTACHMENT
Filed May 11, 1936
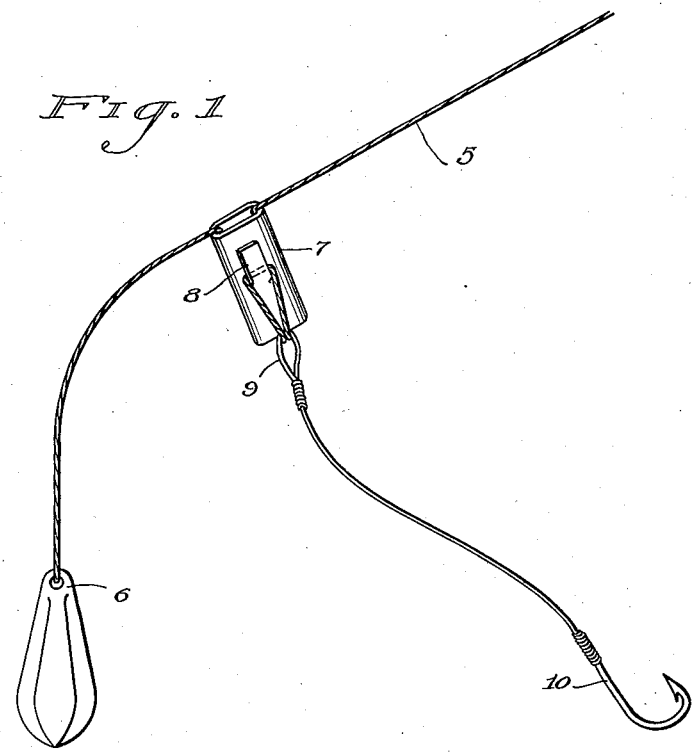
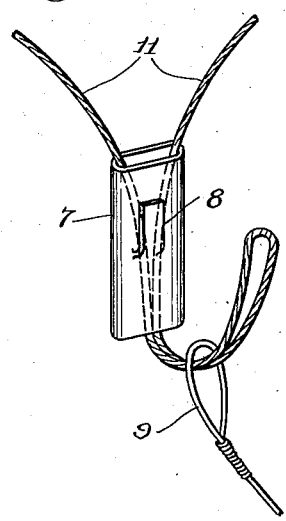
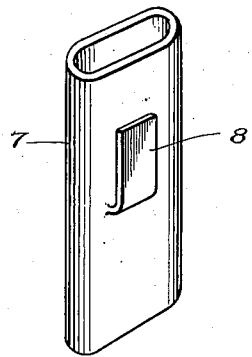
Otto Bulow
INVENTOR
BY Victor J. Evans & Co.
ATTORNEYS Patented May 31, 1938

2,119,418

UNITED STATES PATENT OFFICE 2,119,418

FISHING LINE ATTACHMENT

Otto Bulow, St. Albans, N. Y.

Application May 11, 1936, Serial No. 79,166

2 Claims. (Cl. 43—28)

The present invention relates to a fishing line attachment designed especially for use as a connecting member between the hook and the line.

The primary object of the invention resides in the provision of a connecting member which permits with facility the attachment and removal of a hook and line.

A further object of the invention resides in the provision of a connecting member for a hook and line that maintains the hook at right angles to the line at all times and in the event that the line should become tangled, the hook can be readily removed, thus rendering it easier and less dangerous to untangle the line.

The invention will be fully and comprehensively understood from a consideration of the following detailed description when read in connection with the accompanying drawing which forms part of the application.

In the drawing:

Fig. 1 is a perspective view of a fishing line showing the new and improved connecting member attaching a hook to the line.

Fig. 2 is a perspective view of the connecting member and illustrating the method of detaching a hook therefrom; and Fig. 3 is a perspective view of the connecting member apart from the line.

Referring to the drawing for a more detailed description thereof, the numeral 5 indicates a fishing line supporting at one end thereof a lead sinker or the like 6 in the usual manner. It is customary to attach one or more hooks to the line and position the same above the lead sinker. For accomplishing this purpose there is provided a connecting member 7 formed preferably of aluminum or other light weight material and of the general shape and contour illustrated in Fig. 3 of the drawing. The member 7 is preferably oval shaped in cross-section and the interior thereof is hollow for threadedly receiving the line 5 for the attachment of a hook thereto. The edges of the member 7 which contact the line when attached thereto are rounded so as to alleviate the possibility of the line becoming severed. A hook shaped member 8 is soldered or otherwise secured to the member 7 and is preferably positioned centrally thereof and, when in use, the looped end of the line 5 is positioned over the member 8, as illustrated in Fig. 1 of the drawing.

When using the connecting member for attaching a hook to a line, attention is directed to Fig. 2 of the drawing, a loop is formed intermediate the ends of the line and said loop is threaded thru the interior of the member 7 and said looped end is then inserted in a second loop 9 which forms a part of the line which normally carries the hook 10. The looped end of the line 5 is then positioned over the hook 8 of the connector 7, whereupon the ends 11 of the line 5 are tightened so as to cause the loop 9 to enter the lower portion of the member 7. When so positioned, the connector 7 is securely attached to the line and may be readily removed by grasping the connector in the right hand and pulling lightly on the loop 9 of the hook 10 with the left hand, thus causing a slack in the line so that the looped end may be detached from the hook 8, thus returning the respective members to the position illustrated in Fig. 2 of the drawing.

It will be readily apparent that one or more of the connecting members 7 may be positioned within the line as in some instances it is desired to utilize two or more hooks on a single line, depending upon the character of the fishing.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. As a new article of manufacture, a hollow, flattened piece of light metal having a portion extruded and bent upwardly to form a detent, the hollow portion being adapted to receive substantially parallel bights of flexible material, such as a loop in a fishing line, said extruded and bent portion being adapted to receive the loop of said flexible member carrying the loop of another flexible member, such as the standing-line of a fish-hook.

2. A new and improved article of manufacture comprising a connector for fishing lines and hooks, said connector being substantially oval shaped in cross-section and having a passageway therethrough for receiving the fishing line and constructed to position the connector at substantially right angles to the line, and means on said connector and opening upwardly and substantially parallel to the body for attaching said line.

OTTO BULOW.